United States Patent
Doh et al.

(10) Patent No.: US 7,112,770 B2
(45) Date of Patent: Sep. 26, 2006

(54) HUMIDIFICATION SYSTEM AND METHOD FOR A MOBILE PLATFORM

(75) Inventors: Justin H. Doh, Lynnwood, WA (US); George Bates, III, Bothell, WA (US)

(73) Assignee: The Boeing Company, Chicago, IL (US)

( * ) Notice: Subject to any disclaimer, the term of this patent is extended or adjusted under 35 U.S.C. 154(b) by 113 days.

(21) Appl. No.: 10/678,905

(22) Filed: Oct. 3, 2003

(65) Prior Publication Data

US 2005/0072776 A1   Apr. 7, 2005

(51) Int. Cl.
    H05B 6/64    (2006.01)
(52) U.S. Cl. .................. 219/682; 219/679; 219/681; 219/687; 219/688; 392/386; 392/387; 392/394; 392/395; 392/397; 392/398
(58) Field of Classification Search ................ 219/682, 219/679, 681, 687–688; 392/386–387, 394–395, 392/397–398
See application file for complete search history.

(56) References Cited

U.S. PATENT DOCUMENTS

| 5,417,276 | A | | 5/1995 | Dobry | |
|---|---|---|---|---|---|
| 5,699,983 | A | * | 12/1997 | Ellsworth | ................. 244/118.5 |
| 5,816,496 | A | * | 10/1998 | Kovacs | ...................... 237/78 R |
| 6,064,047 | A | * | 5/2000 | Izzo | ........................... 219/688 |

* cited by examiner

*Primary Examiner*—Shawntina Fuqua
(74) *Attorney, Agent, or Firm*—Harness Dickey & Pierce P.L.C.

(57) ABSTRACT

A humidification system and method particularly well adapted for use in commercial aircraft to provide substantially micro-organism free humidified air within a passenger cabin of the aircraft. The system employs a vessel for holding a quantity of water therein. The vessel is disposed within a microwave oven which is used to heat the water within the vessel to the boiling point such that steam is generated therefrom. This steam is directed into an airflow duct and used to humidify an airflow being supplied into a cabin area of the aircraft. The steam is substantially micro-organism free. A controller is used to cycle the filling and draining of the vessel to achieve a desired humidity level for the airflow. Optimally, a vacuum accumulator is employed to assist in rapid draining of the water from the vessel.

23 Claims, 2 Drawing Sheets

HUMIDIFICATION SYSTEM AND METHOD FOR A MOBILE PLATFORM

FIELD OF THE INVENTION

The present invention relates to humidification systems, and more particularly to a humidification system and method which removes micro-organisms and mineral deposits from water being used in the system to provide even cleaner humidified air within a confined area.

BACKGROUND OF THE INVENTION

Humidification systems are used in buildings and mobile platforms such as aircraft, and other moving platforms, to humidify the air within a confined area in which occupants or passengers are residing. The humidification of the air can significantly add to the comfort of occupants or passengers.

One drawback with presently utilized humidification systems is that most suffer from relatively high maintenance, in addition to accumulations of mineral deposits from the water, the growth/transmittal of micro-organisms from the water used, relatively high noise, or a combination of these problems. In relatively small, predefined areas, such as within a passenger cabin area of an aircraft, where the aircraft is pressurized and the only airflow through the cabin is the humidified air flow, the need to remove micro-organisms and present a substantially bacteria-free airflow is particularly important. In aircraft applications, the added maintenance required because of the accumulation of mineral deposits in various components of the system is further highly undesirable because such maintenance action adds additional cost to an airline operating the aircraft.

In view of the foregoing, it would be highly desirable to provide a humidification system that is especially well suited for use on mobile platforms such as aircraft, busses, trains, ships, etc. that does not suffer from the traditional high maintenance associated with previously developed humidification systems. It would also be highly desirable to provide a humidification system which is capable of destroying micro-organisms from water being used in the system to thus provide a bacteria-free, humidified airflow to passengers, occupants and/or crew members on a mobile platform. It would further be highly desirable to provide such a humidification system which does not add significant additional cost, does not require significant additional maintenance and does not take up appreciable space on board the mobile platform.

SUMMARY OF THE INVENTION

The present invention is directed to an apparatus and method for providing even cleaner humidified area within a pre-defined area of a room or confined area of a mobile platform. In one preferred embodiment the present invention includes a vessel for receiving a quantity of water. The vessel is disposed within an oven and further includes an outflow conduit for steam vapor generated within the vessel when it is heated, and a water outflow conduit for allowing water to be drained from the vessel. The steam outflow conduit is directed into an airflow conduit carrying an airflow to a room or other area. In one preferred form the humidification system of the present invention is adapted for use with a commercial aircraft although it will be appreciated that the present invention can be used to help humidify a room within a fixed structure or an area within any other type of mobile platform such as a bus, train, ship, etc.

A controller is used for controlling the admittance of fresh water into the vessel as well as the draining of water from the vessel. Optimally, but preferably, an overflow drain is coupled to the vessel to drain any water in the vessel that rises above a predetermined upper level during a heating cycle.

In operation, the water inside the vessel is heated by the oven to generate steam. Advantageously, the energy generated by the oven kills all or substantially all of the micro-organisms in the water. As a result, the steam generated during this heating operation is at least substantially micro-organism free. The steam is routed through the vapor outflow conduit into the airflow conduit where it becomes entrained in the airflow being directed into the room or other confined area. In one preferred embodiment an injection valve is utilized to help better disperse the steam vapor within the airflow. After each heating cycle is completed, the quantity of water within the vessel is drained by the controller opening the valve in the water outflow conduit.

In another preferred embodiment specifically well adapted for use on a high speed moving platform such as a commercial aircraft, a vacuum accumulator is incorporated for helping to assist in draining the water from the vessel. The vacuum accumulator has an input which is in communication with an output of the water outflow conduit. The vacuum accumulator also has an output which is in communication with a drain mast of the aircraft. After each heating cycle, the quantity of water within the vessel is drained therefrom into the vacuum accumulator. A vacuum being exerted at the drain mast by the high speed movement of the aircraft generates a vacuum within the accumulator. This vacuum further helps in drawing the water out from the vessel, through the accumulator, and out through the drain mast into the ambient environment.

The various preferred embodiments enable a substantially micro-organism free humidified airflow to be provided to a room or cabin area of a mobile platform. The rapid draining away of water after the heating cycle further helps to significantly reduce the build up of mineral deposits within the vessel and other components of the system. As a result, the humidification system of the present invention reduces the need for periodic maintenance thereof which in turn can contribute to a reduction in the cost of operating the humidification system.

Further areas of applicability of the present invention will become apparent from the detailed description provided hereinafter. It should be understood that the detailed description and specific examples are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
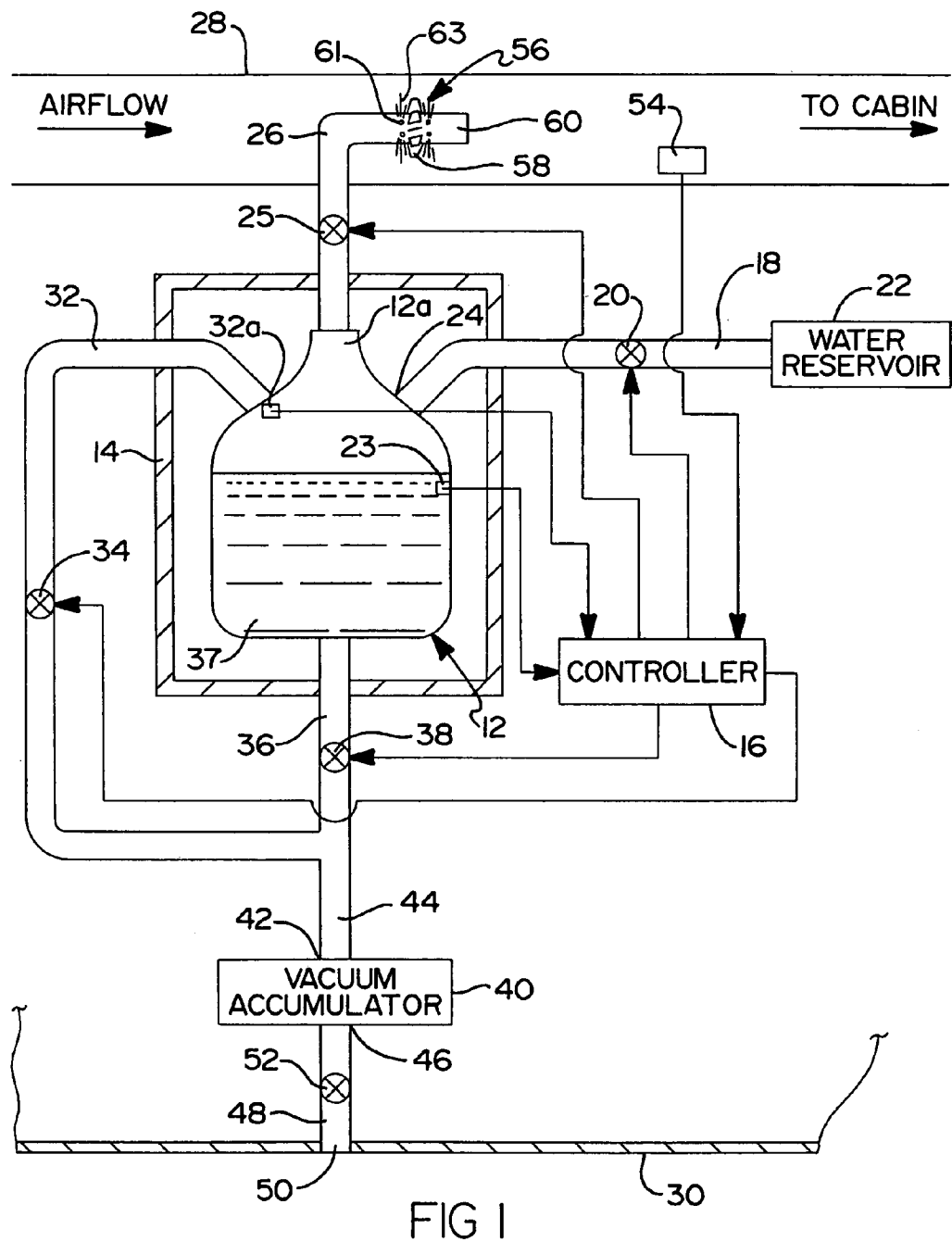
FIG. 1 is a diagram of a humidification system in accordance with a preferred embodiment of the present invention disposed within the fuselage of an aircraft.

Referring to FIG. 1, there is shown a humidification system 10 in accordance with a preferred embodiment of the present invention. The humidification system 10 can be used within fixed structures to provide an especially clean, mineral and micro-organism free, humidified airflow within a confined area, such as a room, of the structure, or alternatively it can be used within a mobile platform such as an aircraft, bus, train, ship or other moving structure. While the following description will describe the system 10 as being used with an aircraft, it will be appreciated that the system can be employed in a variety of applications and is therefore not limited to only those involving aircraft.

The system generally includes a vessel 12 for containing a predetermined quantity of water therein, a microwave oven 14 within which the vessel is disposed for heating the water within the vessel 12, and a controller 16 for controlling operation of the system 10. The controller 16 controls the admittance of fresh water into the vessel 12 through a water supply conduit 18 by controllably opening and closing a valve 20 disposed in the water supply conduit. The water flowing through the water supply conduit 18 is supplied from a suitable potable water reservoir 22. A water level sensor 23 monitored by the controller 16 is used to monitor the level of water within the vessel 12 during a fill cycle when the vessel 12 is filled. The water supply conduit 18 has an output end 24 through which water may be drained or pumped into the vessel 12 to fill the vessel. The vessel 12 may be a ceramic vessel or may be made from any suitable material that is able to withstand repeated heating and cooling cycles.

The system 10 further includes a steam or vapor outflow conduit 26 which is in communication with an upper end 12a of the vessel 12 to receive steam generated as the water is heated within the vessel 12. A pressure regulator valve 25 is disposed within the outflow conduit 26 and controlled by the controller 16. The vapor flows through the conduit 26, through the pressure regulator valve 25 and into air flowing through an airflow conduit 28. The water vapor is intermixed with the airflow and eventually is directed into a cabin area of an aircraft 30.

The system 10 further preferably comprises a water overflow, pressure relief conduit 32 which is also in communication with the vessel 12. A pressure regulator valve 34 controlled by controller 16 is disposed in the overflow/pressure relief conduit 32, and is selected such that it opens when a predetermined over pressure is reached in the conduit 32 or an overflow condition occurs in the conduit 32. The controller is also able to control this valve in the event of any condition wherein immediate opening or closing of this valve is required. Sensing of a fluid overflow condition is accomplished by a sensor 32a placed adjacent to the level of an overflow port 32b in the vessel that communicates with conduit 32. Thus, if the pressure within the vessel 12 exceeds a predetermined upper limit, then pressure within the vessel 12 may be alleviated by the overflow/pressure relief valve 34 opening and draining a subquantity of water from the vessel 12. Similar logic is used for sensing an overflow condition of vessel 12.

The system 10 further includes a drain or outflow conduit 36 which is in communication with a lower end 37 of the vessel 12. The drain conduit 36 includes a valve 38 disposed therein which is controlled by the controller 16. When the drain valve 38 is opened, water within the vessel 12 may be drained through the conduit 36 and a fresh quantity of water admitted into the vessel 12.

Referring further to FIG. 1, an optional vacuum accumulator 40 is included for assisting in the draining of water from the vessel 12. The vacuum accumulator 40 includes an input 42 which is in communication with an outlet end 44 of the drain conduit 36. The vacuum accumulator 40 further includes an outflow port 46 which is coupled to a drain mast 48 of the aircraft 30. An output port 50 of the drain mast 48 is in communication with the ambient environment outside the aircraft 30. The drain mast 48 includes a one way, vacuum actuated pressure relief valve 52 disposed therein. While the vacuum accumulator 40 forms an especially convenient means for assisting and emptying the contents of the vessel 12, it will be appreciated that the system 10 could readily be employed without it. For example, portion 44 of drain conduit 36 could be coupled directly to the drain mast 50 to allow draining of fluid from the vessel 12 directly into the drain mast 48. However, the use of the vacuum accumulator guarantees a vacuum source will be present even when aerodynamic conditions surrounding the drain mast 48 output port 50 do not provide favorable vacuum conditions when the vessel 12 is commanded to drain the water and minerals from the vessel 12.

The microwave oven has a power rating of preferably between about 250 watts–1000 watts although it will be appreciated that a microwave oven having a power rating outside this range could readily be employed. The principal factor in determining the power required for the microwave is the amount of water that needs to be heated within a given time. Assuming the vessel 12 has the capacity to hold one quart (0.95 liter) of water, and further assuming that the temperature of water supplied from the reservoir 22 into the vessel 12 is approximately 50° F. (10° C.), then an oven having a power rating of preferably at least about 1000 watts will be preferred to bring the water to the boiling point within about fifteen minutes. Suitable microwave ovens are available from various companies such as Panasonic and Sanyo. Furthermore, any suitable type of heating system/device could be implemented, provided same is able to heat the water in the vessel rapidly to the boiling point, such as for example radar energy. As such, it will be appreciated that the present invention is not limited to use with only a microwave oven. However, the use of a microwave oven provides the advantage that the water does not need to contact any heating element, and this reduces the possibility of any buildup of minerals on the heating component of the system, which many previously developed systems are susceptible to.

With further reference to FIG. 1, the controller 16 may optionally monitor an output from a humidity sensor 54 disposed within the airflow conduit 28. If the humidity sensor 54 is employed, then a "closed loop" humidity sensing system may be formed with the controller monitoring the real time humidity of the airflow 28 and controlling valves 20 and 38 to adjust the admittance and draining of water, respectively, so as to maintain the humidity of the airflow 28 within a given predetermined range.

Figure 2:
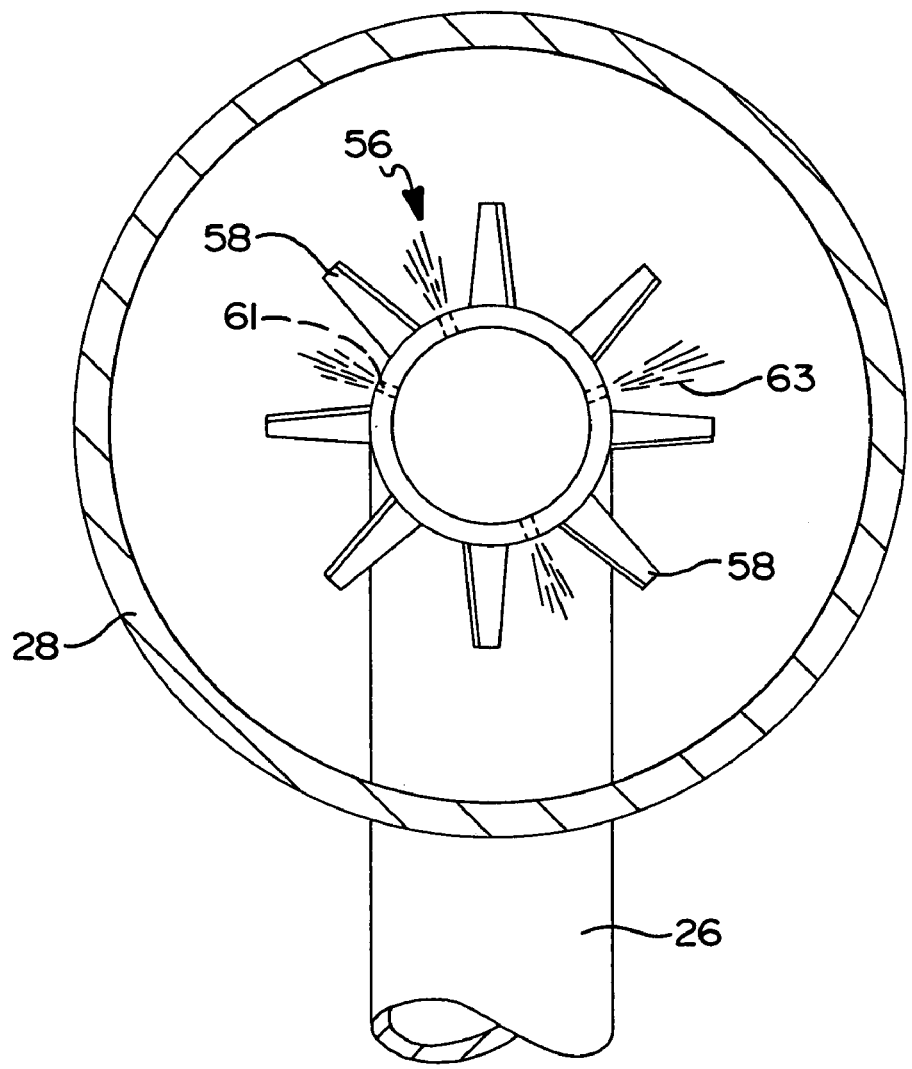
FIG. 2 is an end view of the injection nozzle used with the humidification system of the present invention.

With further reference to FIGS. 1 and 2, an injection nozzle 56 can optionally be employed to help better disburse the steam exiting through the vapor conduit 26. The injection nozzle 56 is disposed generally longitudinally in line with the airflow flowing through the conduit 28 and includes a, plurality of vanes 58. The vanes 58 are arranged in a circumferential pattern (FIG. 2) to extend from a tubular member 60 and are further arranged such that they are disposed at preferably about a 15°–20° angle of attack relative to the direction of flow of the air flowing within the conduit 28. The tubular member 60 is fixedly coupled to the vapor outflow conduit 26 and includes a plurality of openings 61 therein. The steam exiting from the vapor outflow conduit 26 flows through the openings 61 and into the airflow conduit 28 and forms steam jets 63. The air flowing in the airflow conduit 28 encounters the staggered steam jets 63 exiting through the openings 61 and begins to intermix therewith. Further mixing of the steam jets 63 and the air flowing in the conduit occurs as a result of the swirling action imparted to the air/stream jet mixture by the vanes 58. Essentially, the vanes 58 help to create a swirling, turbulent, air/stream flow that causes thorough intermixing of the air and steam jets 63.

Turning now to the operation of the system 10, initially the controller 16 opens valve 20 to admit a predetermined quantity of water into the vessel 12 from the water reservoir 22 through water inflow conduit 18. The water flows through output end 24 of the conduit 18 and fills the vessel 12 until water level sensor 23 signals to controller 16 that the water has reached a predetermined upper level within the vessel 12. At this point the controller 16 closes valve 20 to interrupt the flow of water through the water supply conduit 18. It will also be appreciated that while the vessel 12 is filling, the controller 16 maintains valve 38 in a closed position.

The controller 16 then causes the microwave oven 14 to be turned on to begin heating the water within the vessel 12. The microwave oven 14 heats the vessel 12 for a time sufficient to allow the water to come to a boil. This in turn generates mineral/micro-organism free steam within the vessel 12 which rises through the vapor outflow conduit 26. At this point the controller 16 turns off the microwave oven 14 for a brief period of time as the pressure of the steam is regulated through the valve 25 and through the vapor outflow conduit 26, and flows through the openings 61 in the tubular member 60. The steam jets 63 are dispersed by the injection valve 56, that induces a swirl in the air, and that causes the air to be thoroughly intermixed with the steam jets 63 to form the clean, humidified airflow through the vapor outflow conduit 26. The resulting mixture forms an especially clean, mineral free humidified airflow. The humidified air then flows into the cabin of the aircraft 30.

In a preferred implementation the pressure regulator valve 25 is selected such that it remains closed until a predetermined steam pressure is reached that is preferably about 1.0 psi greater than the known pressure in the airflow conduit 28. In this manner, the steam entering the airflow conduit 28 will be slightly super heated. The slightly super heated steam readily mixes with the air flowing in the airflow conduit 28, thus avoiding the need for a large cone or other large rotating structure to ensure thorough mixing. This also avoids the problem with large duct pressure losses in the airflow conduit 28 that can be caused by large cones or like rotating structures that are typically used to induce a swirl in the airflow.

After a brief predetermined time, the controller 16 shuts down the microwave oven and opens valve 38, thus allowing the water within the vessel 12 to be drained therefrom. The water is drained very rapidly in part by a vacuum supplied by the vacuum accumulator 40. This rapid evacuation of water from the vessel 12 helps to drain minerals in the water and prevent the buildup of such minerals within the vessel 12. As will be appreciated, the boiling of the water within the vessel 12 produces a generally micro-organism free vapor which allows a humidified airstream to be generated which is also substantially free of micro-organisms.

If the vacuum accumulator 40 is incorporated into the system 10, then the draining of water from the vessel 12 is accomplished especially rapidly. The vacuum accumulator, in one preferred form, comprises a metal canister, although it will be appreciated that other materials could be used just as well provided same are structurally rigid and can withstand the drop in pressure as a result of the vacuum generated.

As the aircraft operates, its relatively high speed of movement causes a drop in pressure at the outlet port 50 of the drain mast 48. This drop in pressure causes pressure relief valve 52 to open and air within the vacuum accumulator 40 is drawn out therefrom. Eventually the pressure on both sides of the pressure relief valve 52 will equalize and the valve will close. When the controller 16 determines that water needs to be drained from the vessel 12, it opens valve 38. The pressure of the steam (i.e., vapor) generated within the vessel 12 helps to push the water out of the vessel 12 into the drain conduit 36 and through the open valve 38 into the vacuum accumulator 40. At the moment valve 38 is opened by controller 16, the low pressure area formed within the vacuum accumulator 40 assists in rapidly draining water out through the drain conduit 36, through the vacuum accumulator 40, through the drain mast 48 and out into the ambient environment. To begin a subsequent cycle, the controller then closes valve 38 and opens valve 20 to admit a fresh quantity of water from the water reservoir 22 into the vessel 12, and the above-described cycle is repeated. If humidity sensor 54 is employed, the controller 16 monitors this sensor and adjusts the above-described cycle accordingly through the control of valves 20 and 38 such that the humidity of the air flowing through the airflow conduit 28 is maintained within a predetermined range.

While the vacuum accumulator 40 forms an especially convenient means for ensuring that the water is drained quickly out of the vessel 12 after a heating cycle is completed, if the vacuum being experienced by the drain mast 48 is not sufficient to provide the intended vacuum, then the water drained from the vessel 12 will be temporarily stored within the accumulator 40. The use of the vacuum accumulator 40 eliminates some of the drawbacks with previous humidification systems employed in aircraft where the vacuum experienced by the drain mast 40 is not always sufficient to assist in the draining process. Such conditions can occur, for example, when the aircraft is in a descent or a turn. During these conditions, there may not be a sufficient vacuum created on the drain mast 48 to assist in quickly draining water from the vessel 12. As a result, water may not be drained sufficiently quickly to permit the initiation of a new heating cycle. The vacuum accumulator 40, however, itself forms a temporary fluid reservoir for those times when the aircraft may be in a phase of flight where sufficient vacuum is not present at the drain mast 48 to permit rapid draining of the water from the vessel 12.

The use of a microwave oven to boil the water provides a micro-organism free, humidified airflow into the cabin area of the aircraft 30. This further serves to reduce maintenance and help to prevent the growth/transmittal of micro-organisms within various components of the system 10. These factors serve to significantly reduce maintenance costs when operating system 10.

The system of the present invention further forms a relatively quiet system and further provides the benefit that components thereof are not consumed or rapidly worn out during operation, which are drawbacks typically associated with previously developed humidification systems.

The present invention further effectively eliminates minerals from the steam that is generated from the water in the vessel. Previously developed systems that make use of an evaporating sponge or atomization process allow the minerals to enter the airstream in the airflow duct. These minerals can collect and form a white powder in the duct, and be transmitted as white dust into the air of a flight deck or cabin area when an aircraft makes a hard landing. With the steam-based system 10 of the present invention, the minerals are left in the water in the boiler, rather than being transported via the steam into the air stream flowing in the flight deck or cabin.

Furthermore, the system 10 helps to reduce pressure losses in the ducting used within the aircraft which can help to reduce the back pressure on an air-conditioning system employed during normal operation of the aircraft. The use of a micro-organism free humidification system significantly improves the comfort of the environment within the cabin of the aircraft as well as helping to provide cleaner air for the occupants to breathe.

While various preferred embodiments have been described, those skilled in the art will recognize modifications or variations which might be made without departing from the inventive concept. The examples illustrate the invention and are not intended to limit it. Therefore, the description and claims should be interpreted liberally with only such limitation as is necessary in view of the pertinent prior art.

What is claimed is:

1. A humidification system for providing substantially micro-organism free water vapor into an airflow conduit flowing a quantity of air therethrough, said system comprising:
    a vessel for containing a quantity of water, wherein the water contains micro-organisms, said vessel including an inlet valve for admitting water into said vessel;
    an oven for containing said vessel and heating said water to a temperature, and for a duration, sufficient to at least substantially remove said micro-organisms and to generate a substantially micro-organism free steam;
    a vapor outlet conduit for channeling said substantially micro-organism free steam into said airflow conduit to humidify said air flowing through said airflow conduit; and
    a controller for controlling said drain valve and said inlet valve, and for turning on and off said microwave oven, said controller further controlling said drain valve such that an entire quantity of heated water is drained from said vessel before said controller causes said inlet valve to admit a fresh quantity of water into said vessel.

2. The system of claim 1, wherein said oven comprises a microwave oven.

3. The system of claim 1, further comprising a water drain line in communication with said vessel for allowing said quantity of water to be drained from said vessel, said water drain line housing said drain valve.

4. The system of claim 3, further comprising a vacuum accumulator in communication with said water drain line for assisting in withdrawing said quantity of water from said vessel through said water drain line, and at least temporarily containing said quantity of water.

5. The system of claim 1, further comprising a water supply conduit in communication with said vessel for supplying said quantity of water to said vessel.

6. The system of claim 1, further comprising a humidity sensor in communication with the vapor outlet conduit for detecting a level of humidity in said air flowing in said airflow conduit.

7. The system of claim 1, further comprising a vapor injection nozzle for receiving said substantially micro-organism free steam from said vapor outlet conduit and dispersing same into said air flowing through said airflow conduit.

8. The system of claim 7, wherein said vapor injection nozzle comprises:
    a plurality of vanes, said vanes being subject to said air flowing through said airflow conduit such that said vanes cause said air flowing in said airflow conduit to swirl to thus help in dispersing and intermixing said substantially micro-organism free steam with said air.

9. The system of claim 1, further comprising a water overflow conduit in communication with said vessel for receiving any of said water contained in said vessel that overflows from said vessel during heating of said water by said oven.

10. The system of claim 1, wherein said water overflow conduit includes a pressure relief valve for allowing a flow of said water through said water overflow conduit only when a predetermined pressure is reached in said water overflow conduit.

11. The system of claim 1, further comprising:
    a pressure regulating valve disposed in said airflow conduit for regulating a flow of said steam into said airflow conduit and maintaining a pressure of said steam at a pressure present in said airflow conduit.

12. A system for humidifying air being supplied within a confined area, said system comprising:
    an airflow conduit for providing a flow of air into said confined area;
    a vessel for containing a quantity of water, wherein the water contains micro-organisms;
    an oven for heating said water in said vessel to a temperature, and for a duration, sufficient to at least substantially remove said micro-organisms and to generate a substantially micro-organism free steam;
    a vapor injection system for injecting said substantially micro-organism free steam into said airflow conduit and assisting in mixing said substantially micro-organism free steam with said air flowing through said airflow conduit to humidify said air; and
    a controller for draining an entire quantity of heated water within said vessel after a heating cycle before causing a fresh quantity of water to be admitted into said vessel.

13. The system of claim 12, wherein said oven comprises a microwave oven.

14. The system of claim 12, further comprising a water supply conduit for supplying said quantity of water to said vessel.

15. The system of 14, further comprising:
    a valve disposed in said water supply conduit; and
    wherein said controller controls said valve to admit only said quantity of water into said vessel, said quantity representing a volume of water sufficient to fill said vessel to a desired level.

16. The system of claim 12, further comprising a water drain conduit for draining water from said vessel.

17. The system of claim 16, further comprising a valve disposed in said water drain conduit for controlling a draining of water from said vessel.

18. The system of claim 12, further comprising a water overflow conduit in communication with said vessel for draining water that rises above a predetermined level in said vessel, from said vessel.

19. The system of claim 12, further comprising a humidity sensor for sensing a level of humidity in said air flowing in said airflow conduit.

20. The system of claim 12, further comprising a water level sensor for sensing a level of water in said vessel.

21. The system of claim 12, further comprising a vacuum accumulator in communication with said vessel for assisting in draining said water from said vessel after said water has been heated for a predetermined time.

22. The system of claim 12, wherein said vapor injection system comprises:
 a vapor outflow conduit in communication with said vessel; and
 a plurality of vanes disposed in a path of said air flowing through said airflow conduit to cause a swirling of said air flowing in said airflow conduit to assist in dispersing said substantially micro-organism free steam into said air.

23. The system of claim 12, further comprising:
 a pressure regulator valve for regulating a pressure of said steam entering said airflow conduit.

* * * * *